No. 722,042. PATENTED MAR. 3, 1903.
ANGEL POL Y AGUIRRE.
ELECTROMAGNETIC MOTOR.
APPLICATION FILED AUG. 28, 1902.
NO MODEL. 2 SHEETS—SHEET 1.

WITNESSES:
Edward Thorpe.
Walton Harrison.

INVENTOR
Angel Pol y Aguirre
BY
ATTORNEYS.

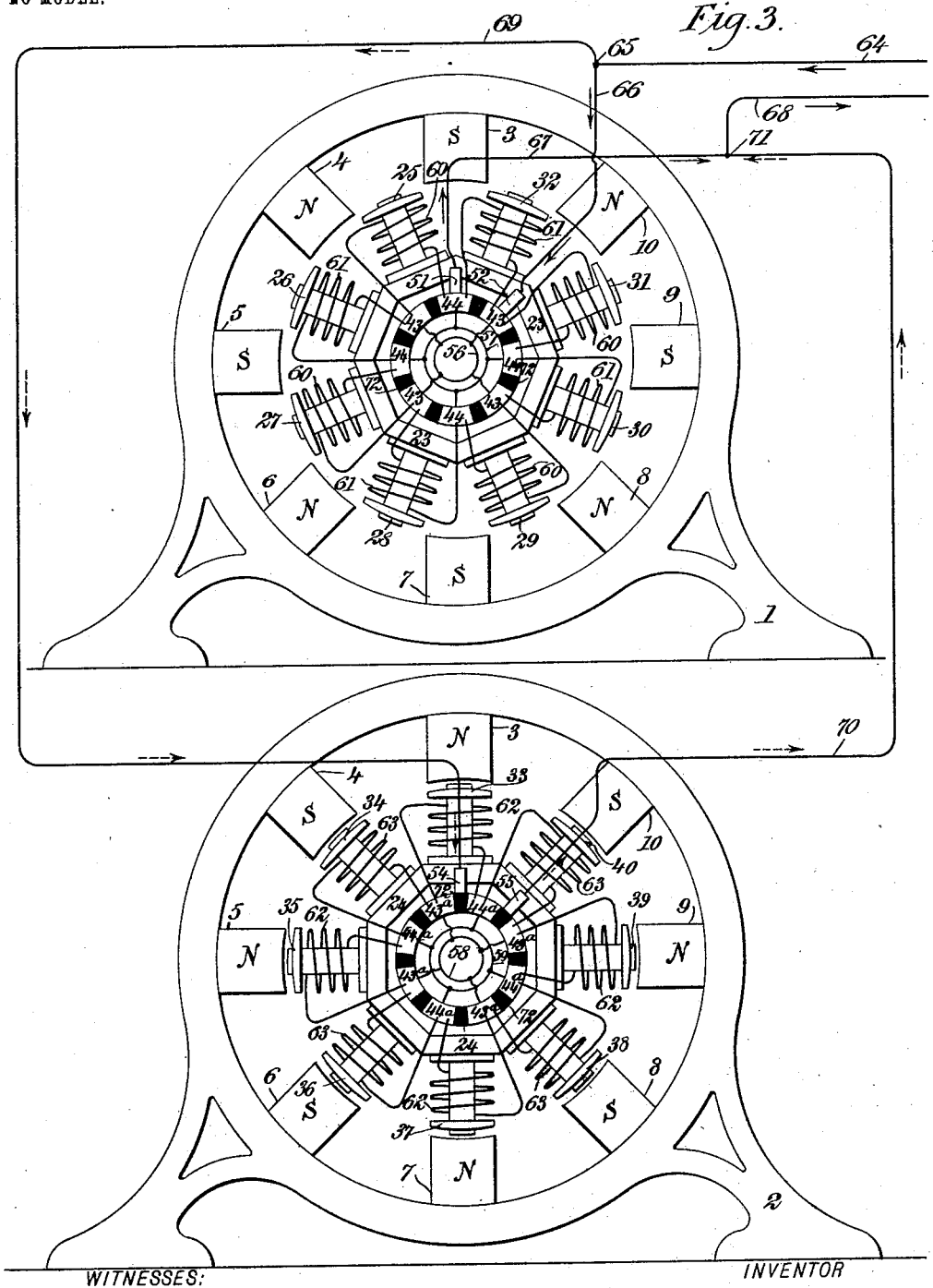

UNITED STATES PATENT OFFICE.

ANGEL POL Y AGUIRRE, OF HAVANA, CUBA.

ELECTROMAGNETIC MOTOR.

SPECIFICATION forming part of Letters Patent No. 722,042, dated March 3, 1903.

Application filed August 28, 1902. Serial No. 121,334. (No model.)

*To all whom it may concern:*

Be it known that I, ANGEL POL Y AGUIRRE, a citizen of Cuba, and a resident of Havana, Cuba, have invented a new and Improved Electromagnetic Motor, of which the following is a full, clear, and exact description.

My invention relates to improvements in electromagnetic motors, the more particular object being to produce a simple and efficient motor having certain advantages, as hereinafter described and claimed.

I will describe an electromagnetic motor embodying my invention and then point out the novel features in the appended claims.

Reference is to be had to the accompanying drawings, forming a part of this specification, in which similar characters of reference indicate corresponding parts in all the figures.

Figure 1:
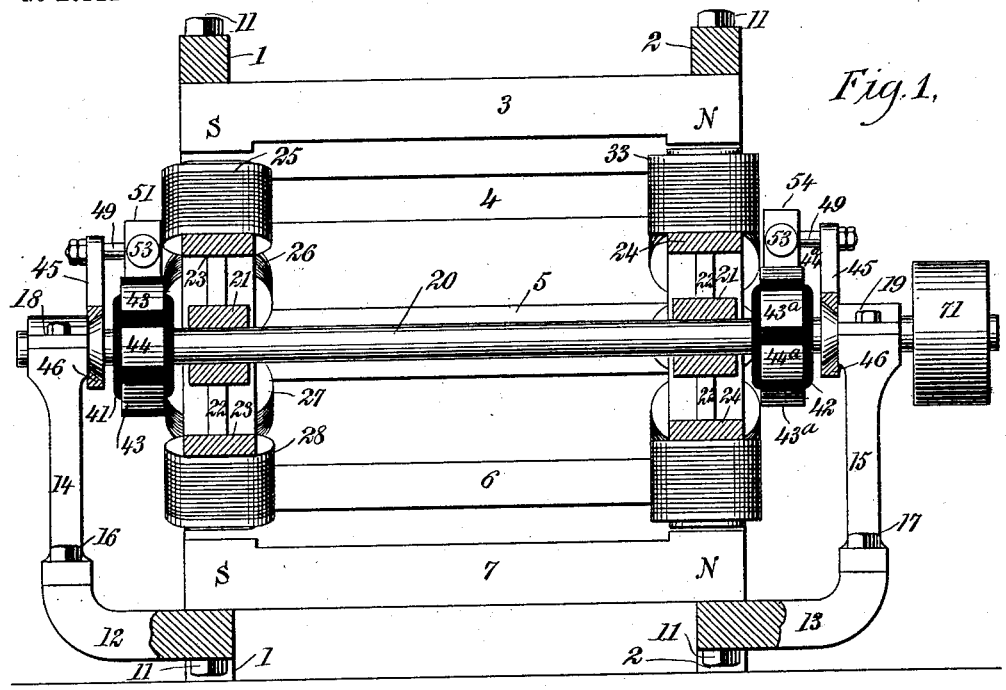
Figure 2:
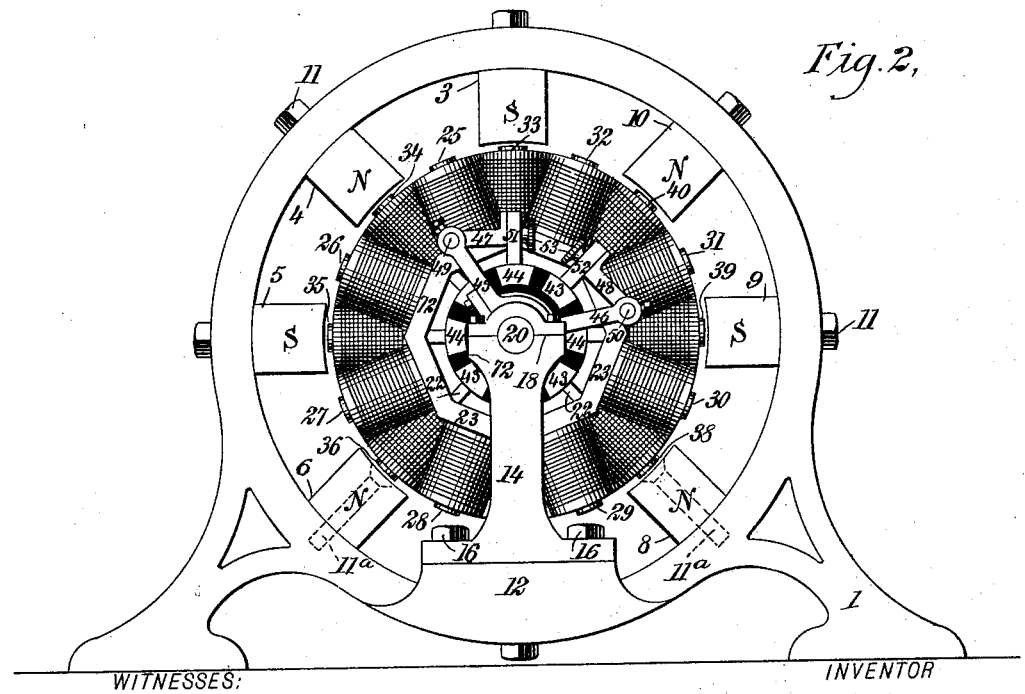

Figure 1 is a central vertical section through a motor embodying my invention. Fig. 2 is a side elevation showing the same as viewed from the left, and Fig. 3 is a diagram showing the disposition of the several magnets and windings.

A pair of substantially circular frames 1 2, made, preferably, of bronze or other non-magnetic material, are used for mounting the several movable parts. Secured at each end upon these frames and connecting the same rigidly together are a number of longitudinal permanent magnets 3, 4, 5, 6, 7, 8, 9, and 10. Each of these magnets is of the so-called "bar" type, its respective north and south ends being somewhat enlarged, as indicated in Fig. 1. The north end of one magnet is disposed adjacent to the south end of the next succeeding magnet, so that when the frame is viewed from either side the magnetic poles appear to be alternately arranged, as indicated in Fig. 2. Metallic bolts 11 and 11ª are used for the purpose of securing the magnets and the frame rigidly together. The several parts described are so connected that the magnets have the general form of a substantially cylindrical cage. The object in having the frame 1 2 of non-magnetic material is to prevent inductive action upon it by means of the magnets of the field and of the armature. The permanent magnets above described constitute the field, which is stationary. The frames are provided with integral brackets 12 13, which support the bearing-standards 14 15, the same being secured in position by means of the bolts 16 17 and provided with journal-bearings 18 19. Revolubly mounted within these bearings is a shaft 20, and fitted rigidly upon this shaft are collars 21, provided with spokes 22 and supporting the octagonal frames 23 24. These parts are preferably integral and made of non-magnetic material.

Mounted upon the octagonal frame 23 are a plurality of electromagnets 25, 26, 27, 28, 29, 30, 31, and 32. Similarly, upon the octagonal frame 24 are mounted the electromagnets 33, 34, 35, 36, 37, 38, 39, and 40. The magnets upon the frames 23 24 are disposed in a staggered relation relatively to each other, as indicated more particularly in Fig. 2. For this purpose the frames 23 24 are placed slightly askew relatively to each other. The object of this arrangement is to cause the magnets at each end of the shaft 20 to be acted upon at different moments, thereby avoiding dead-points. The armature as a whole consists of a pair of twin armatures, which for certain purposes may be considered as independent, but which mutually assist each other in passing dead-points.

Disposed upon the shaft 20 and rigidly connected therewith are reversing-collectors 41 42. The collector 41 consists of a plurality of metallic sectors 43, electrically connected together and alternated with a plurality of somewhat similar sectors 44, which are also connected electrically together, but separated from each other by means of insulating-blocks 72. The collector 42 is similar to the collector 41, the sectors 43ª being connected together electrically and the sectors 44ª being likewise electrically connected together. The two collectors are arranged slightly askew, so that the sectors at one end of the armature are disposed between the sectors at the other end thereof. In other words, the sectors, like the electromagnets, are in staggered relation.

Radial arms 45 46 are provided with brackets 47 48, connected therewith by pivotal supports 49 50 for the purpose of supporting the carbon-brushes 51 52, these brushes being adjustably secured in position by means of screws 53. The radial arms 45 46 are integrally connected together and are radially adjustable for the purpose of changing the radial positions of the brushes in the usual manner. The brushes 54 55 are in all respects similar to the brushes 51 52. The sectors 43 are connected with a ring 56, whereas the sectors 44 are connected with a ring 57. It will thus be seen, therefore, that while electrical intercommunication is established between the sectors 43 and also between the sectors 44 these two distinct sets of sectors have no direct communication each with the other. Similarly, the sectors 43$^a$ are connected with the ring 58 and the sectors 44$^a$ with the ring 59, so that the sectors 43$^a$ communicate with each other and the sectors 44$^a$ likewise communicate with each other; but there is no direct communication between the sectors 43$^a$ and 44$^a$. The sectors 44 are connected indirectly with the sectors 43 by means of the windings 60 61, as indicated in Fig. 3. Similarly, the sectors 43$^a$ are connected with the sectors 44$^a$ by means of the windings 62 63. The windings upon each group of magnets at either end of the shaft are exactly alike, but are so disposed relatively to the sectors that the currents pass through the coils 60 and travel in a different direction to those passing through the coils 61, and the currents pasing through the coils 62 similarly travel in a different direction to those passing through the coils 63. By these means the magnets 25, 27, 29, and 31 all have like polarity, but may, however, be reversed at any moment, and the magnets 26, 28, 30, and 32 likewise have like polarity, but contrary to that of the magnets just mentioned, and may also be reversed at any moment according to the position of the sectors relatively to the brushes. In like manner the magnets 33, 35, 37, and 39 have similar but reversible polarity, which is always contrary to the polarity of the intervening magnets 34, 36, 38, and 40. By means of the arrangement above described each electromagnet always attracts the pole of the permanent magnet immediately ahead of it and repels the pole of the permanent magnet immediately to the rear. Each electromagnet is therefore driven by both an attractive and a repulsive force at any time except when the brushes rest upon the insulating-block 72, and this never occurs at both ends of the armature at the same time. The current enters by the main 64, arrives at the junction 65, and divides into two currents, which flow in parallel. One of these currents flows through the wire 66 and brush 52 through one of the sectors 43 to the ring 56, which serves as a distributing-center. From the sectors connected with this ring the current flows in parallel through the windings 60 in one direction—say contra-clockwise as viewed from the ring 56—and flows in parallel and in the opposite direction—say clockwise—through the windings 61. By these means the magnets 25, 27, 29, and 31 are given a different polarity to the magnets 26, 28, 30, and 32, so that while one of the magnets—for instance, the magnet 25—is being attracted by a north pole and repelled by a south pole and while another magnet immediately adjacent—say the magnet 32—is being attracted by a south pole and repelled by a north pole all of these forces conspire to rotate the armature in a particular direction, which forces in the view shown in Fig. 3 would be contra-clockwise. The other parallel current, above mentioned, in passing from the junction 65 traverses the wire 59 and goes to the other end of the motor, where it immediately finds the brush 54 resting upon an insulating-block 72. The current, therefore, is unable to enter the sector for an instant; but, as above described, this can only occur at one end of the motor at the same time. Since the rotation of the armature causes the collector 42 to shift slightly, the current from the brush 54 energizes the segment 43$^a$ and passes in parallel and in a contra-clockwise direction, as viewed from the center, through the coils 62, and likewise passes in multiple arc, but in a clockwise direction, as viewed from the center, through the coils 63. The magnets 33, 35, 37, and 39 are thus given a different polarity to the intervening magnets 34, 36, 38, and 40, and the polarity of each of these routes of magnets is therefore reversed each time the brushes engage succeeding sectors. The rotation caused by all of the electromagnets is therefore such as to turn the shaft in the same direction. The current after traversing the coils 60 and 61 is gathered upon the sectors 44 and ring 57 and leaves through the brush 51, wire 67, and junction 71 to the main 68. Similarly, at the other end of the motor the current after passing through the coils 62 63 is gathered upon the sectors 44$^a$ and ring 59 and thence passes through one of the sectors 44$^a$, through the brush 55 and wire 70 and junction 71, from whence it proceeds to the main 68.

Having thus described my invention, I claim as new and desire to secure by Letters Patent—

1. An electromagnetic motor, comprising a frame provided with bearings, a revoluble shaft mounted upon said bearings, twin members of non-magnetic material mounted upon said shaft and provided with facets, said twin members being so disposed that said facets are staggered relatively to each other, electromagnets upon said facets and disposed in separate groups staggered relatively to each other, a distributing-ring connected with every second electromagnet of each group, a collector-ring connected with the magnets not thus connected with said distributing-rings, commutators and brushes for connecting said collector-rings and said distributing-rings with respective mains of opposite sign, a plurality of permanent bar-magnets mounted upon said frame and arranged in the form of a cage, each bar being of opposite polarity to other bars immediately adjacent thereto.

2. An electromagnetic motor, comprising a frame provided with bearings, a revoluble shaft mounted upon said bearings, twin members of non-magnetic material mounted upon said shaft and provided with facets, said twin members being so disposed that said facets are staggered relatively to each other, electromagnets mounted upon said facets and disposed in two groups staggered relatively to each other, a distributing-ring connected with every second electromagnet of each group, a collector-ring connected with the magnets not thus connected with said distributing-ring, commutators and brushes for connecting said collector-rings and distributing-rings with separate mains of opposite sign, and a magnetic field disposed adjacent to the paths of said electromagnets.

In testimony whereof I have signed my name to this specification in the presence of two subscribing witnesses.

ANGEL POL Y AGUIRRE.

Witnesses:
ANTONIO M. MOLINA,
F. W. HANAFORD.